US010275233B2

(12) United States Patent
Lo

(10) Patent No.: US 10,275,233 B2
(45) Date of Patent: Apr. 30, 2019

(54) SOFTWARE UPDATE METHOD APPLIED TO TELEVISION AND ASSOCIATED CIRCUIT

(71) Applicant: MStar Semiconductor, Inc., Hsinchu Hsien (TW)

(72) Inventor: Chun Chih Lo, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/639,283

(22) Filed: Jun. 30, 2017

(65) Prior Publication Data
US 2018/0225106 A1   Aug. 9, 2018

(30) Foreign Application Priority Data

Feb. 6, 2017   (TW) .............................. 106103786 A

(51) Int. Cl.
G06F 9/44 (2018.01)
G06F 8/65 (2018.01)
H04N 21/81 (2011.01)
H04N 21/435 (2011.01)
G06F 8/654 (2018.01)
H04N 21/443 (2011.01)
H04N 21/458 (2011.01)

(52) U.S. Cl.
CPC ................ *G06F 8/65* (2013.01); *G06F 8/654* (2018.02); *H04N 21/4353* (2013.01); *H04N 21/443* (2013.01); *H04N 21/4586* (2013.01); *H04N 21/8166* (2013.01)

(58) Field of Classification Search
CPC ... G06F 8/70; G06F 8/654; G06F 8/65; H04L 41/20; H04N 21/8166; H04N 21/4353
See application file for complete search history.

(56) References Cited

U.S. PATENT DOCUMENTS

| 5,109,414 | A | * | 4/1992 | Harvey | G01R 1/071 725/135 |
| 6,975,689 | B1 | * | 12/2005 | McDonald | H04L 25/03159 348/726 |
| 7,769,344 | B1 | * | 8/2010 | Harvey | G06Q 30/0251 345/629 |
| RE45,774 | E | * | 10/2015 | Beach | H04N 5/782 |
| 9,268,552 | B1 | * | 2/2016 | Kiiskila | G06F 8/65 |
| 2001/0012447 | A1 | * | 8/2001 | Horiguchi et al. | H04L 12/40058 386/219 |
| 2002/0023020 | A1 | * | 2/2002 | Kenyon | G06Q 30/02 704/231 |

(Continued)

FOREIGN PATENT DOCUMENTS

TW   200501750   1/2005

*Primary Examiner* — Adam Lee
(74) *Attorney, Agent, or Firm* — McClure, Qualey & Rodack, LLP

(57) ABSTRACT

A software update method applied to a television includes: downloading an update image file through a network, wherein the update image file includes an update script and a plurality of sets of data; storing the update image file to a memory; reading the update script from the memory; obtaining information of the data from the update script; sequentially reading the data from the memory according to the information; performing a padding operation on the data to generate a plurality of sets of padded data; and updating software in the television according to the padded data.

20 Claims, 4 Drawing Sheets

(56) References Cited

U.S. PATENT DOCUMENTS

| | | | | |
|---|---|---|---|---|
| 2002/0146125 A1* | 10/2002 | Eskicioglu | ............ | H04L 9/0825 380/255 |
| 2003/0066062 A1* | 4/2003 | Brannock | ................ | G06F 8/665 717/169 |
| 2004/0013409 A1* | 1/2004 | Beach | .................... | H04N 5/782 386/260 |
| 2004/0107237 A1* | 6/2004 | Kashiwada | ............... | G06F 8/65 709/200 |
| 2005/0157554 A1* | 7/2005 | Yanagawa | ............ | G06F 9/4401 365/185.17 |
| 2007/0169080 A1* | 7/2007 | Friedman | ................. | G06F 8/65 717/168 |
| 2009/0013356 A1* | 1/2009 | Doerr | .................. | H03M 13/29 725/62 |
| 2010/0037216 A1* | 2/2010 | Carcerano | ................ | G06F 8/65 717/173 |
| 2012/0072896 A1* | 3/2012 | Watanabe | .............. | H04N 7/163 717/170 |
| 2012/0079473 A1* | 3/2012 | Watanabe | ................. | G06F 8/65 717/170 |
| 2012/0114302 A1* | 5/2012 | Randall | ................. | G11B 27/105 386/241 |
| 2012/0206492 A1* | 8/2012 | Fukui | ..................... | G06F 3/048 345/660 |
| 2013/0031372 A1* | 1/2013 | Oltmans | ........... | G06F 17/30091 713/189 |
| 2015/0046913 A1* | 2/2015 | Cui | ....................... | G06F 8/4442 717/152 |
| 2015/0089490 A1* | 3/2015 | Nakawaki | ................. | G06F 8/61 717/174 |
| 2015/0341586 A1* | 11/2015 | Allison, III | .............. | H04N 5/40 348/724 |
| 2016/0249109 A1* | 8/2016 | Nelson | ............... | H04N 21/4882 |
| 2017/0185390 A1* | 6/2017 | Luo | ...................... | H04N 21/235 |

* cited by examiner

SOFTWARE UPDATE METHOD APPLIED TO TELEVISION AND ASSOCIATED CIRCUIT

This application claims the benefit of Taiwan application Serial No. 106103786, filed Feb. 6, 2017, the subject matter of which is incorporated herein by reference.

BACKGROUND OF THE INVENTION

Field of the Invention

The invention relates to a software update method applied to a television and an associated method.

Description of the Related Art

When software in a television needs updating, an update image file is obtained usually through over-air download (OAD), and the software of the television is then updated according to the update image file. An update image file usually has an extremely large data size, and so the update image file is often compressed into a compressed file to reduce the download time. Operations including decompression and updating are performed after the compressed file is downloaded to the television. However, an additional buffer area is required for the decompression operation, meaning that a large memory space is needed, hence causing increased costs.

SUMMARY OF THE INVENTION

It is an object of the present invention to provide a software update method applied to a television. Without increasing the download time, an update image file can be downloaded and software of the television can be updated by involving a smaller memory space to solve issues of the prior art.

A software update method applied to a television is disclosed according to an embodiment of the present invention. The method includes: downloading an update image file through a network, wherein the update image file includes an update script and a plurality of sets of data; storing the update image file to a memory; reading the update script from the memory; obtaining information of the data from the update script; sequentially reading the data from the memory according to the information; performing a padding operation on the plurality of sets of data to generate a plurality of sets of padded data; and updating software in the television according to the padded data.

A circuit applied to a television is disclosed according to another embodiment of the present invention. The circuit includes a network interface circuit and a control circuit. The network interface circuit connects to an external network. The control circuit downloads an update image file including an update script and a plurality of sets of data through the network interface circuit, and stores the update image file to a memory. The control circuit further reads the update script from the memory to obtain information of the data from the update script, reads the data from the memory according to the information, and performs a padding operation on the plurality of sets of data to generate a plurality of sets of padded data for updating software in the television.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
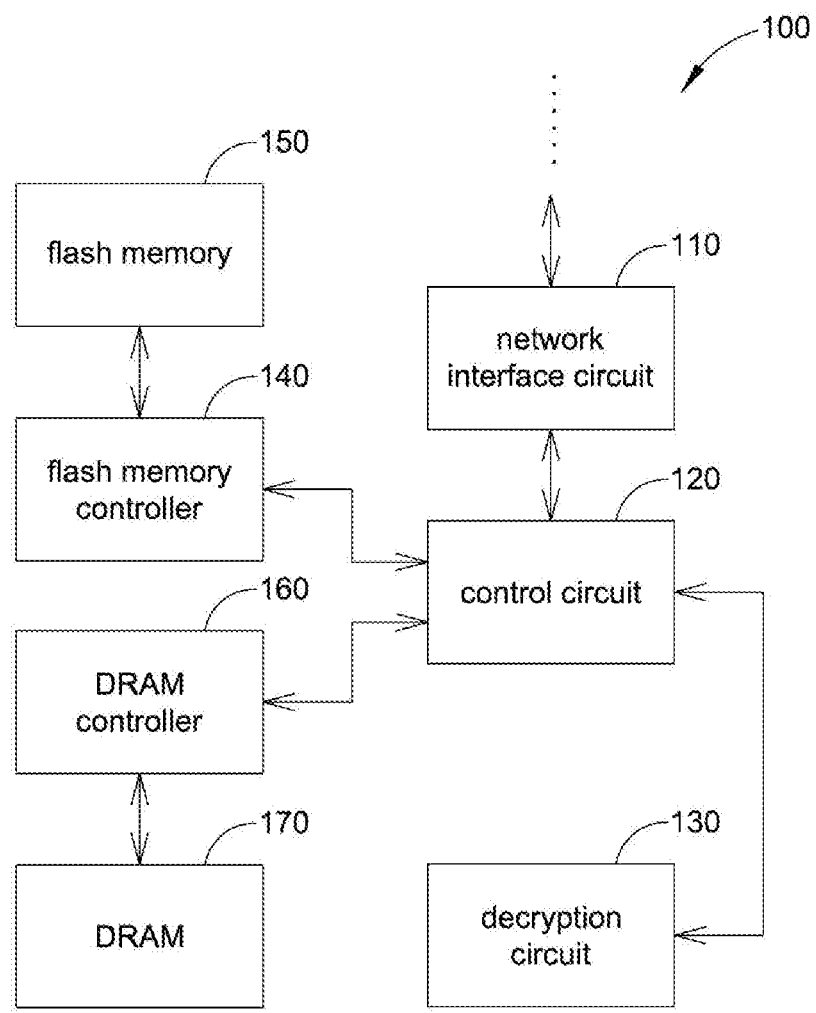
FIG. 1 is a block diagram of a television according to an embodiment of the present invention.

FIG. 1 shows a block diagram of a television 100 according to an embodiment of the present invention. As shown in FIG. 1, the television 100 includes a network interface circuit 110, a control circuit 120, a decryption circuit 130, a flash memory controller 140, a flash memory 150, a dynamic random access memory (DRAM) controller 160 and a DRAM 170. In this embodiment, the control circuit 120 accesses the flash memory 150 through the flash memory controller 140 and accesses the DRAM 170 through the DRAM controller 160. The flash memory 150 stores software application that controls the operation of the television 100, and the control circuit 120 may obtain an update image file by over-air download (OAD) through the network interface circuit 110 to update the software application.

The object of the present invention focuses on the method for updating software in the television 100, and details of the components in the television 100 are omitted herein.

Figure 2:
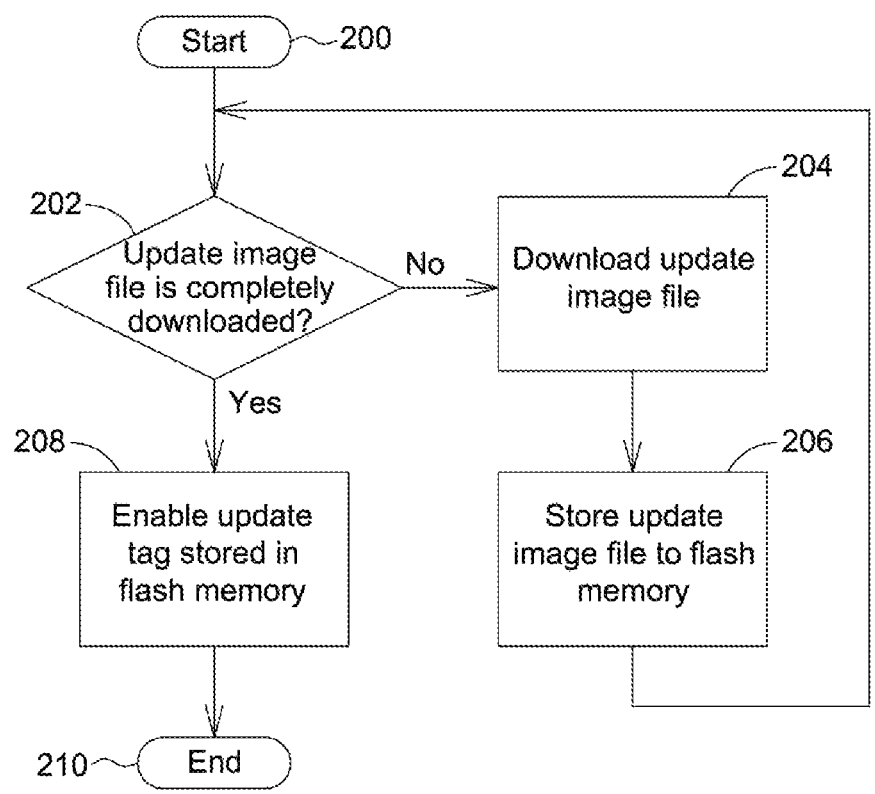
FIG. 2 is a flowchart of downloading an update image file according to an embodiment of the present invention.

Referring to FIG. 1 and FIG. 2, FIG. 2 shows a flowchart of downloading an update image file according to an embodiment of the present invention. In step 200, the process begins, and the control circuit 120 downloads the update image file from an external network through the network interface circuit 110. In step 202, the control circuit 120 checks whether the update image file is completely download. Step 204 is performed when the update image file is not yet completely downloaded, otherwise step 208 is performed when the update image file is completely downloaded. In step 204, the control circuit 120 continues sequentially downloading multiple parts of the update image file through the network interface circuit 110, and temporarily stores the multiple parts of the downloaded update image file to the DRAM 170 through the DRAM controller 160. In step 206, the control circuit 120 sequentially relocates the multiple parts of the update image file originally stored in the DRAM 170 to the flash memory 150 through the DRAM controller 160 and the flash memory controller 140. In step 208, after the update image file is completely downloaded, the control circuit 120 enables an update tag stored in the flash memory 150 to indicate that a new image file is available for software update. The process ends in step 210.

In this embodiment, the update image file includes an update script and multiple sets of data. The multiple sets of data include kernel data, root file system data, provider data, security data and signature data. The update script and the multiple sets of data may be encrypted data or non-encrypted data. Further, the update image file may be compressed data or non-compressed data. In this embodiment, the update image file is encrypted data based on security reasons, and is non-compressed data based on cost considerations. Thus, the non-compressed updated image file need not be decompressed, and so the capacity of DRAM 170 may be reduced to save costs. It should be noted that, because an additional buffer space in the DRAM 170 is needed for the decompression process, the requirement of such buffer space may be eliminated when the update image file is non-compressed data. During the download process, it is not necessary to temporarily store an entire downloaded file in the DRAM 170. Thus, although the non-compressed update image file is larger than a compressed update image file, the requirement for the DRAM 170 is in fact not increased. Further, due to the larger data size of the non-compressed update image file, the download time may be increased. Thus, in this embodiment, among the multiple sets of data included in the update image file, except the update script that has a predetermined fixed file size, file sizes of the remaining data are associated with the amount of contents included and do not have predetermined file sizes through padding data. That is, the file size of the update image is reduced as the data size of padding data is reduced. Further, the update script records information of data sizes of the remaining multiple sets of data.

Figure 3:
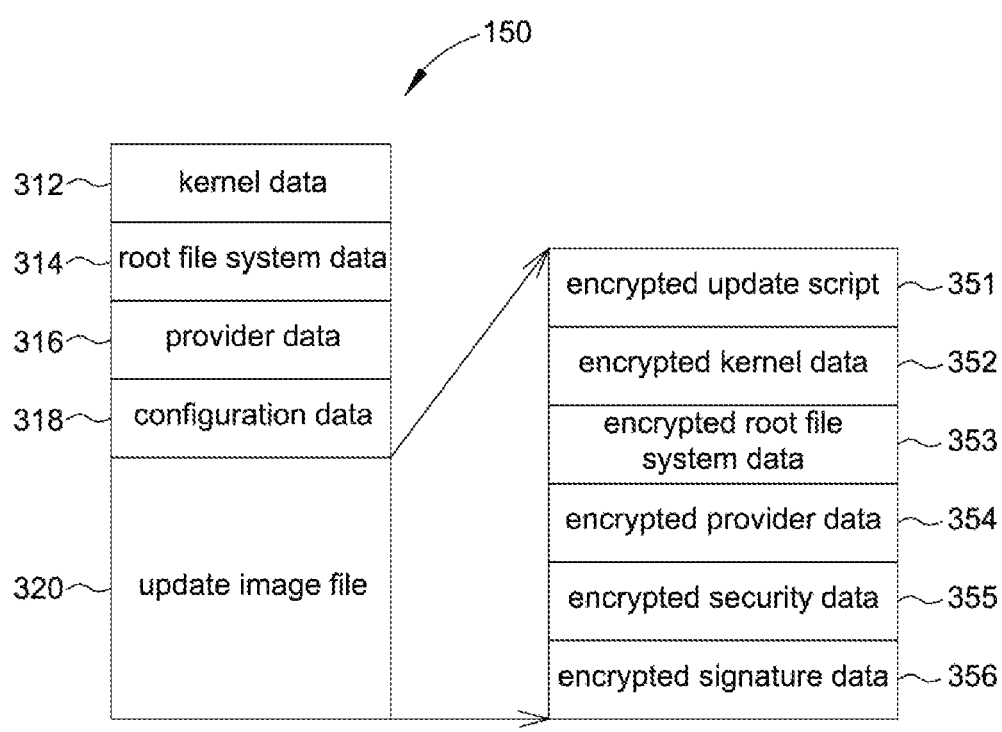
FIG. 3 is a schematic diagram of data stored in a flash memory.

FIG. 3 shows a schematic diagram of data stored in the flash memory 150. As shown in FIG. 3, the flash memory 150 at least includes five segments 312 to 320. The segment 312 stores the kernel data, the segment 314 stores the root file system data, the segment 316 stores the provider data, the segment 318 stores the configuration data, and the segment 320 stores the downloaded update image file. The update image file is for updating the data respectively stored in the segments 312 to 318. To prevent errors in data reading, the sizes of the segments 312 to 318 are predetermined, hence ensuring that data of another segment is not read when the data of one of the segments is read. Further, as previously described, the update image file in this embodiment adopts encrypted but non-compressed data. Thus, the update image file stored in the segment 320 includes an encrypted update script 351, encrypted kernel data 352, encrypted root file system data 353, encrypted provider data 354, encrypted security data 355, and encrypted signature data 356.

Figure 4:
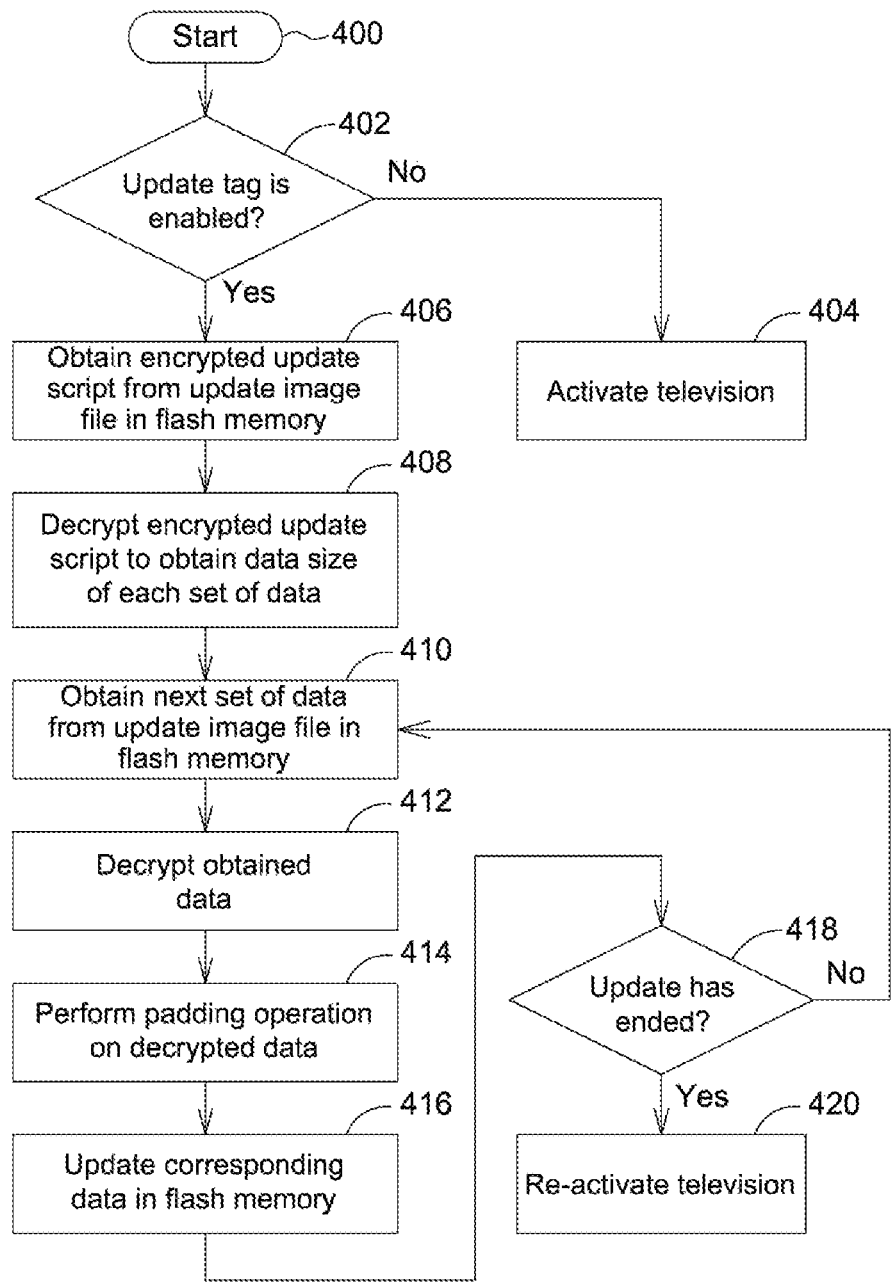
FIG. 4 is a flowchart of updating data stored in a segment of a flash memory by a downloaded update image file according to an embodiment of the present invention.

FIG. 4 shows a flowchart of updating data stored in the segments 312 to 318 in the flash memory 150 by using a downloaded update image file according to an embodiment of the present invention. In step 400, the process begins, and the television 100 is connected to a power supply and powered on. In step 402, the control circuit 120 checks whether the update tag in the flash memory 150 is enabled. When the update tag is enabled, it means that a new image file for software update is available in the flash memory, and so step 406 is performed. When the update tag is not enabled, it means that no new image file for software update is available in the flash memory 150, and the process enters step 404 to directly activate the television 100. The step of activating the television 100 may be performed according to the kernel data and the root file system data stored in the segments 312 and 314 of the flash memory 150.

The encrypted update script 351 included in update image file has a predetermined fixed file size (e.g., 0x2000 bytes), and is located at a frontmost part of the update image file. Thus, in step 406, the control circuit 120 directly obtains the encrypted update script 351 from the first 0x2000 bytes of the update image file stored in the segment 320 of the flash memory, and stores the encrypted update script 351 to the DRAM 170. In step 408, the control circuit 120 reads the encrypted update script 351 from the DRAM 170, decrypts the update script 351 through the decryption circuit 130, and stores the decrypted update script back to the DRAM 170. The decryption circuit 130 may include an exclusive memory space for the decryption operation. In this embodiment, the decrypted update script includes respective files sizes of the encrypted kernel data 352, the encrypted root file system data 353, the encrypted provider data 354, the encrypted security data 355 and the encrypted signature data 356. Accordingly, the control circuit 120 is able to determine a starting address of each set of data to further later read each set of data. Further, the decrypted update script remains stored in the DRAM 170 till the entire process ends.

In step 410, the control circuit 120 sequentially reads a next set of data from the segment 320 of the flash memory 150 according to the file sizes of the sets of data. Taking FIG. 3 for example, the control circuit 120 reads the encrypted kernel data 352, decrypts the encrypted kernel data 352 through the decryption circuit 130 to obtain decrypted kernel data in step 412, and performs a data padding operation on the decrypted kernel data to obtain padded kernel data in step 414. Further, in step 414, the DRAM 170 may be used as a buffer area for the decrypted kernel data (non-padded kernel data) and the padded kernel data. As previously described, to prevent errors in data reading, the sizes of the segments 312 to 320 are predetermined, and each set of data stored into the segments 312 to 318 (e.g., the kernel data, the root file system data, . . . ) has a corresponding predetermined file size. When a set of decrypted data obtained after decryption is smaller than the predetermined file size, a padding operation is performed to a rear part of the set of data (adding all "0" or all "1") to have the file size of the set of data equal to the predetermined file size. For example, assuming that predetermined data size corresponding to kernel data is 8 MB and the effective data size of the decrypted kernel data is 6 MB, the control circuit 120 pads 2 MB data to the decrypted kernel data, such that the data size of the padded kernel data becomes 8 MB. In this embodiment, the control circuit 120 may determine the amount of padding data according to the effective data size of decrypted data and the predetermined file size. In another embodiment, the information of the amount of padding data may be directly included in the update script, and the control circuit 120 may then directly perform data padding accordingly without involving an addition comparison process.

In step 416, the control circuit 120 uses the padded kernel data to update television software, i.e., using the padded kernel data to update the kernel data stored in the segment 312 of the flash memory 150. In this embodiment, non-padded kernel data is padded and stored in the DRAM 170, and then updated to the segment 312. In another embodiment, non-padded data may be directly updated to the segment and then padded, i.e., after kernel data is updated, data padding is directly performed in the segment 312 until the segment 312 is fully filled. In other words, the sequences of steps 414 and 416 may be swapped.

In step 418, the control circuit 120 determines whether the update operation has ended. When the update operation has ended, the control circuit 120 sets the update tag stored in the flash memory 150 to disabled, and the process enters step 420 to re-activate the television. When the update operation has not ended, the process returns to step 410 to read a next set of data, e.g., the encrypted root file system data, from the update image file stored in the segment 320 of the flash memory 150, and updates the root file system data stored in the segment 314 shown in FIG. 3 through steps 412, 414 and 416. One person skilled in the art can understand the subsequent update operation for the encrypted provider data 354 after reading the above disclosure, and associated details shall be omitted herein. Further, in this embodiment, although the configuration data stored in the segment 318 does not need update, and the encrypted security data 355 and the encrypted signature data 356 do not need to be updated to the flash memory 150, the present invention is not limited thereto. In other embodiments, the configuration data stored in the segment 318 may be updated, and the encrypted security data 355 and the encrypted signature data 356 may also be updated to the flash memory 150 according to actual requirements.

In one embodiment, to reduce the utilization space of the DRAM 170, each time a set of data is completely updated, contents of the set of data stored in the DRAM 170 are immediately removed from the DRAM 170. For example, after the control circuit 120 updates the kernel data stored in the segment 312 in FIG. 3 by using padded kernel data, the encrypted kernel data, the decrypted kernel data and/or the padded kernel data stored in the DRAM 170 are/is immediately deleted to release the space for a next set of data (i.e., the root file system data).

In summary, the software update method applied to a television of the present invention, through data padding at the television, is capable of achieving operations of downloading an update image file and updating television software while a download time and a required memory space are attended to. Therefore, issues of the prior art are effectively eliminated.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A software update method applied to a television, comprising:
   downloading an update image file through a network, the update image file comprising an update script and a plurality of sets of data;
   storing the update image file to a memory;
   reading the update script from the memory;
   obtaining information of the plurality of sets of data from the update script;
   sequentially reading the plurality of sets of data from the memory according to the information;
   performing a padding operation on the plurality of sets of data to generate a plurality of sets of padded data;
   updating software in the television according to the padded data; and
   activating the television based on the updating.

2. The software update method according to claim 1, further comprising: sequentially decrypting the plurality of sets of data read from the memory to generate a plurality of sets of decrypted data; wherein the step of performing the padding operation on the plurality of sets of data to generate the plurality of sets of padded data is performing the padding operation on the plurality of sets of decrypted data according to file sizes of the plurality of sets of decrypted data to generate the plurality of sets of padded data.

3. The software update method according to claim 2, wherein the information comprises the file sizes of the plurality of sets of decrypted data.

4. The software update method according to claim 2, wherein the memory is a first memory; the step of performing the padding operation on the plurality of sets of decrypted data according to file sizes of the plurality of sets of decrypted data to generate the plurality of sets of padded data is temporarily storing the plurality of sets of decrypted data and the plurality of sets of padded data in a second memory; for first data among the plurality of sets of data, after the corresponding padded data is used to update the software in the television, the decrypted data and the padded data corresponding to the first data are removed from the second memory to release a corresponding space in the second memory to later temporarily store the decrypted data and the padded data corresponding to second data among the plurality of sets of data.

5. The software update method according to claim 4, wherein the first memory is a flash memory, and the second memory is a dynamic random access memory (DRAM).

6. The software update method according to claim 1, wherein the step of performing the padding operation on the plurality of sets of data to generate the plurality of sets of padded data determines an amount of padded data for each of the plurality of sets of data according to the file size of each of the plurality of sets of data and a corresponding predetermined file size.

7. The software update method according to claim 1, wherein the memory is a first memory, the software update method further comprising: storing the update script read from the first memory to a second memory; and reading the update script from the second memory to obtain respective files sizes of the plurality of sets of data, wherein the update script is stored in the second memory before the plurality of sets of padded data is generated.

8. The software update method according to claim 7, wherein the first memory is a flash memory, and the second memory is a dynamic random access memory (DRAM).

9. The software update method according to claim 1, wherein the step of storing the update image file to the memory comprises storing the update image file to a starting space at a predetermined address of the memory; and the step of reading the update script from the memory comprises reading contents of a predetermined file size from the predetermined address of the memory.

10. The software update method according to claim 1, wherein the information comprises respective file sizes of the plurality of sets of data.

11. A circuit included in a television, comprising:
    a network interface circuit, connecting to an external circuit; and
    a control circuit, coupled to the network interface circuit wherein the control circuit executes
        downloading an update image file comprising an update script and a plurality of sets of data through the network interface circuit,
        storing the update image file to a memory,
        reading the update script from the memory,
        obtaining information of the plurality of sets of data from the update script,
        sequentially reading the plurality of sets of data from the memory according to the information,
        performing a padding operation on the plurality of sets of data to generate a plurality of sets of padded data,
        updating software in the television, and
        activating the television based on the updating.

12. The circuit according to claim 11, further comprising: a decryption circuit, the decryption circuit sequentially decrypting the plurality of sets of data that the control circuit reads from the memory to generate a plurality of sets of decrypted data; wherein, the control circuit performs the padding operation on the plurality of sets of decrypted data according to respective file sizes of the plurality of sets of decrypted data to generate the plurality of sets of padded data.

13. The circuit according to claim 12, wherein the information comprises the respective file sizes of the plurality of sets of decrypted data.

14. The circuit according to claim 12, wherein the memory is a first memory, and the control circuit temporarily stores the plurality of sets of decrypted data and the plurality of sets of padded data in a second memory; for first data among the plurality of sets of data, after the corresponding padded data is used to update the software in the television, the decrypted data and the padded data corresponding to the first data are removed from the second memory to release a corresponding space in the second memory to later temporarily store the decrypted data and the padded data corresponding to second data among the plurality of sets of data.

15. The circuit according to claim 14, wherein the first memory is a flash memory, and the second memory is a dynamic random access memory (DRAM), the circuit further comprising: a flash memory controller, for the control circuit to accordingly access the flash memory; and a DRAM controller, for the control circuit to accordingly access the DRAM.

16. The circuit according to claim 11, wherein the control circuit determines an amount of padded data for each of the plurality of sets of data according to the file size of each of the plurality of sets of data and a corresponding predetermined file size.

17. The circuit according to claim 11, wherein the memory is a first memory, and the control circuit stores the update script read from the first memory to a second memory and reads the update script from the second memory to obtain respective file sizes of the plurality of sets of data; before the plurality of sets of padded data is generated, the update script is stored in the second memory.

18. The circuit according to claim 17, wherein the first memory is a flash memory, and the second memory is a dynamic random access memory (DRAM), the circuit further comprising: a flash memory controller, for the control circuit to accordingly access the flash memory; and a DRAM controller, for the control circuit to accordingly access the DRAM.

19. The circuit according to claim 11, wherein the control circuit further stores the update file image to a starting space at a predetermined address of the memory, and starts reading contents of a predetermined file size from the predetermined address of the memory.

20. The circuit according to claim 11, wherein the information comprises respective file sizes of the plurality of sets of data.

* * * * *